(12) United States Patent
Bahar et al.

(10) Patent No.: US 11,940,183 B2
(45) Date of Patent: Mar. 26, 2024

(54) HIGH PRESSURE HYDROGEN ELECTRICAL POWER GENERATOR

(71) Applicant: Xergy Inc, Harrington, DE (US)

(72) Inventors: Bamdad Bahar, Georgetown, DE (US);
Peter Golben, Florida, NY (US);
William Parmelee, Dover, DE (US);
Scott Fackler, Harbeson, DE (US)

( * ) Notice: Subject to any disclaimer, the term of this patent is extended or adjusted under 35 U.S.C. 154(b) by 262 days.

(21) Appl. No.: 17/402,776

(22) Filed: Aug. 16, 2021

(65) Prior Publication Data
US 2021/0396429 A1 Dec. 23, 2021

Related U.S. Application Data

(63) Continuation-in-part of application No. 16/273,043, filed on Feb. 11, 2019, now Pat. No. 11,094,956.

(60) Provisional application No. 62/628,697, filed on Feb. 9, 2018.

(51) Int. Cl.
*H01M 10/39* (2006.01)
*C01B 3/00* (2006.01)
*F24S 60/30* (2018.01)
*H01M 8/065* (2016.01)
*H01M 8/18* (2006.01)
*H02N 3/00* (2006.01)

(52) U.S. Cl.
CPC .......... *F24S 60/30* (2018.05); *C01B 3/0026* (2013.01); *H01M 8/065* (2013.01); *H01M 8/182* (2013.01); *H02N 3/00* (2013.01)

(58) Field of Classification Search
CPC .... H01M 8/182; H01M 8/1039; H01M 8/065; H01M 8/04029; H01M 16/006; H01M 8/1032; H01M 2300/0082; H01M 2008/1095; F24S 90/00; F24S 60/30; C01B 3/0026; C01B 3/0031; H02N 3/00
See application file for complete search history.

(56) References Cited

U.S. PATENT DOCUMENTS

| 2007/0087245 A1 | 4/2007 | Fuller et al. |
| 2008/0063902 A1 | 3/2008 | Kawasaki et al. |
| 2012/0064419 A1 | 3/2012 | Johnson |

*Primary Examiner* — Cynthia K Walls
(74) *Attorney, Agent, or Firm* — Invention To Patent Services; Alex Hobson

(57) ABSTRACT

A hydride heat engine produces electricity from a heat source, such as a solar heater. A plurality of metal hydride reservoirs are heated by the heating device and a working fluid comprises hydrogen is incrementally move from one metal hydride reservoir to a success metal hydride reservoir. The working fluid is passed, at a high pressure, from the last of the plurality of metal hydride reservoirs to an electro-chemical-expander. The electro-chemical-expander has an anode, a cathode, and an ionomer therebetween. The hydrogen is passed from the anode at high pressure to the cathode at lower pressure and electricity is generated. The solar heater may be a solar water heater and the hot water may heat the metal hydride reservoirs to move the hydrogen. The working fluid may move in a closed loop.

19 Claims, 6 Drawing Sheets

HIGH PRESSURE HYDROGEN ELECTRICAL POWER GENERATOR

CROSS REFERENCE TO RELATED APPLICATIONS

This application is a continuation of U.S. application Ser. No. 16/273,043, filed on Feb. 11, 2019 which claims the benefit of priority to U.S. provisional patent No. 62/628,697, filed on Feb. 9, 2018; the entirety of both applications are hereby incorporated by reference herein.

BACKGROUND OF THE INVENTION

Field of the Invention

The invention is directed to an electrical power generator, a hydride heat engine, that utilizes solar energy to thermally power a metal hydride compressor that compresses hydrogen gas that expands through an electrochemical compressor to produce electrical power.

Background

There is a need for low cost electric power generators.

SUMMARY OF THE INVENTION

The invention is directed to low cost electric generator, a hydride heat engine, that utilizes solar energy to thermally power a metal hydride compressor that compresses hydrogen gas from a low pressure to a high pressure. The high pressure hydrogen is the expanded through an Electro-Chemical-Expander that converts the pressurized gas energy directly into electrical power. An Electro-Chemical-Expander comprising an anode, a cathode and an ionomer therebetween will pass the hydrogen from the high-pressure side to the low pressure side and generate electricity. The hydrogen is converted to protons on the anode, or high-pressure side and these protons are transported or move through the ionomer to the cathode side, wherein they are reformed into hydrogen at a lower pressure than the high pressure side. This is a novel way to produce electricity.

A multi-stage hydride compressor may be used to incrementally increase the pressure of the hydrogen gas. Heat, such as from hot water produced from a solar hot water heater or panels provides the thermal energy to move the hydrogen in the multi-stage hydride compressor incrementally to high pressure metal hydride reservoirs. The high-pressure hydrogen is the fed into an Electro-Chemical-Expander that produces electricity.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS THE DRAWINGS

The accompanying drawings are included to provide a further understanding of the invention and are incorporated in and constitute a part of this specification, illustrate embodiments of the invention, and together with the description serve to explain the principles of the invention.

Figure 1:
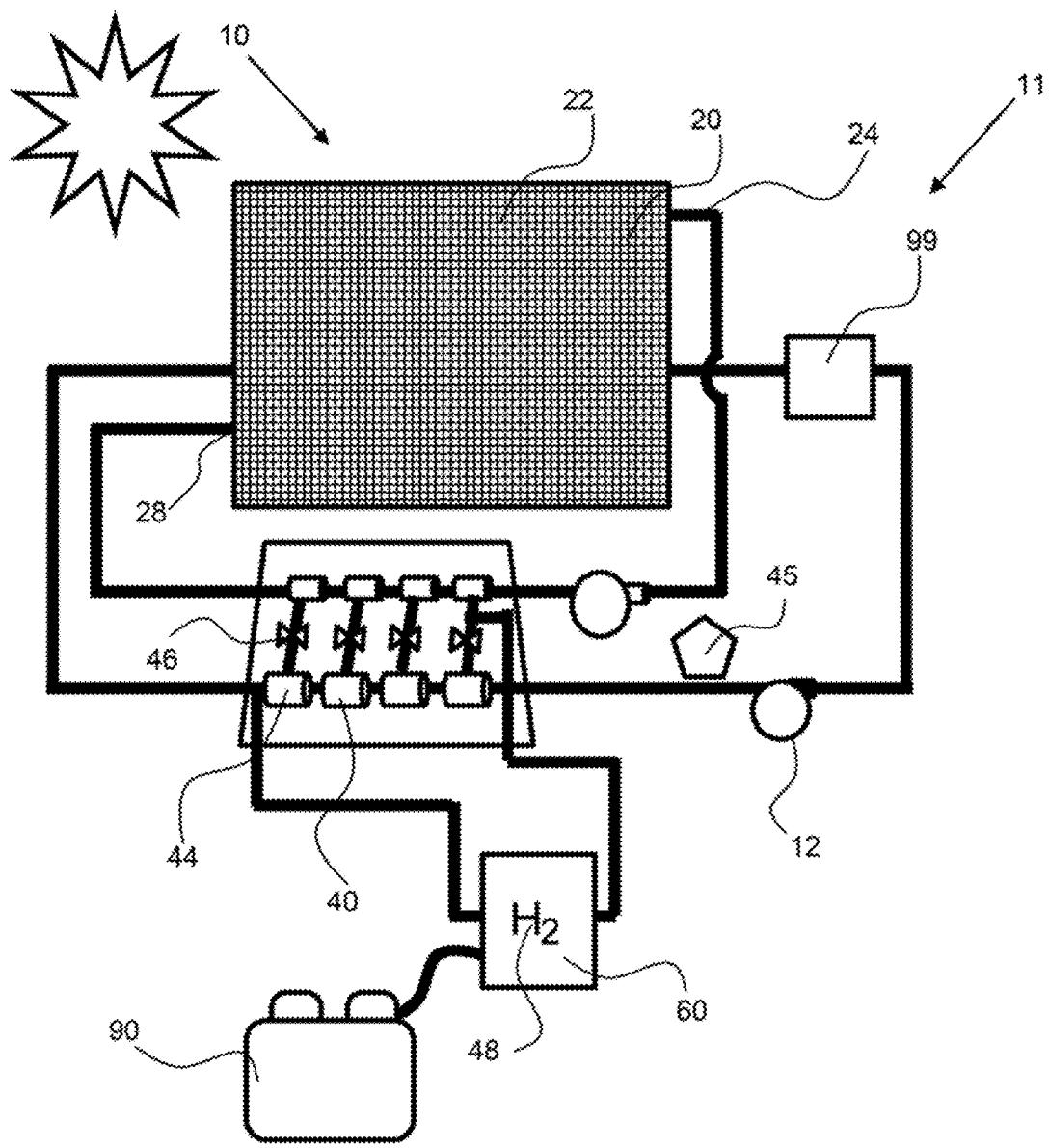
FIG. 1 shows a diagram of an exemplary hydride heat engine that converts solar energy to electricity.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

The present invention provides the only system available in the world today for converting low temperature solar energy into electricity, efficiently and economically. As every scientist can attest, the amount of energy supplied by the sun during a given year is thousands of times greater than the world's annual total energy needs, and by far the most economical way to utilize this free energy is to convert it into low temperature hot water, think 65° C. "garden hose left in the sun". Solar systems that generate electricity are primarily photovoltaic and solar concentrators that are not currently capable of harnessing such energy at competitive prices and such systems are unlikely to be economically viable on a large scale in the foreseeable future.

The present invention however utilizes a metal hydride heat engine or generator to convert low temperature thermal energy from inexpensive flat plate solar collectors into electricity for a cost that is very competitive with today's energy prices.

As shown in FIG. 1, a hydride heat engine 11 produces electrical power from a hot water source, such as a natural source, such as geothermal, or from a renewable source, such as a solar hot water heater. An exemplary solar electrical generator 10 comprises a water heat 20, such as a solar water heater 22 that utilizes the solar energy to heat hot water that is then used to heat metal hydride reservoirs 44 of a multi-stage metal hydride compressor 40. The multi-stage metal hydride compressor 40 then provides hydrogen 48, a working fluid for the system, at a high pressure to an Electro-Chemical-Expander 60 that produces electricity. The electricity may be used to power an electrical device or may be stored in a battery 90, for later use. In this way, power can be stored for use during nighttime hours. The water circulates from an inlet 24, through the hot water heater and out of the outlet 28. The multi-stage metal hydride compressor comprises a series of valves to allow the hydrogen gas to flow from a first metal hydride reservoirs 44 at a first pressure to a second metal hydride reservoir where it is further heated to further increase the pressure. A fan cooler 99 may be used to cool the water as cool or cooled water may be used to cool the metal hydride reservoirs. Note that source water from a water source, such as a body of water, ocean, sea, river, lake, etc. may be used as the water for the cooling of the metal hydride reservoirs. Pumps 12 may be powered by the system or be driven by stored power in the battery or from a secondary source. A series of valves 46 are opened and closed by a controller 45 that may receive input from sensors 49 regarding pressures, flow rates, power output and the like. The controller 45 may control the functions or the system and may comprise a microprocessor and control program that is operated by the microprocessor.

Figure 2:
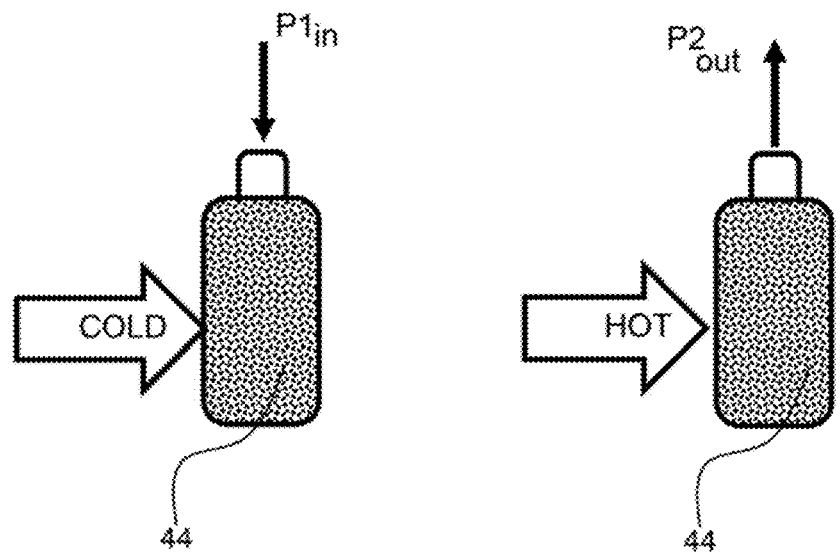
FIG. 2 show a diagram of the steps to produce pressurized hydrogen in a single metal hydride reservoir.
Figure 3:
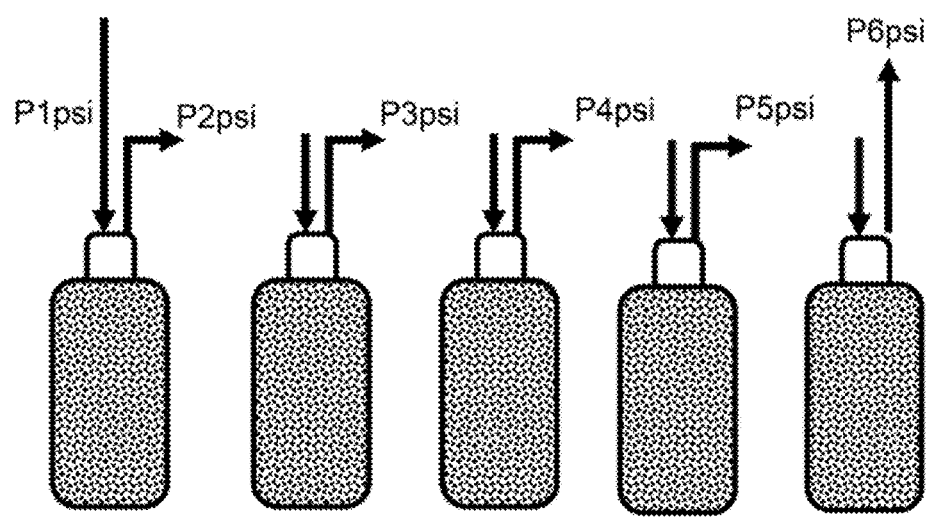
FIG. 3 shows a diagram of a multi-stage metal hydride compressor system having a plurality of metal hydride reservoirs.

As shown in FIG. 2, hydrogen at a first pressure, P1 in, is introduced into the metal hydride reservoir while it is cold. This same metal hydride reservoir is then heated with hot water and the hydrogen is released at P2 out, which may be about three times higher in pressure than P1 in. This process is repeated until the pressure is very high, such as about 3.4 Mpa (500 psi) or higher, about 6.9 Mpa (1,000 psi) or higher, about 17.2 Mpa (2,500 psi) or higher, about 34.5 Mpa (5,000 psi) or higher, or any range between and including the pressures provided. As shown in FIG. 3, the process may be repeated a plurality of times, such as two or more times, three or more times, five or more times, ten or more times to produce very high pressure hydrogen for energy production. Each of the metal hydride reservoirs comprise metal hydride and may be a suitable size for the application, such as about 1 L or more, about 10 L or more, about 100 L or more, about 1,000 L or more and any range between and including the values provided. As shown in FIG. 3, P2 may be about three times greater than P1 and P3 may be about three times greater than P2, and so on.

Figure 4:
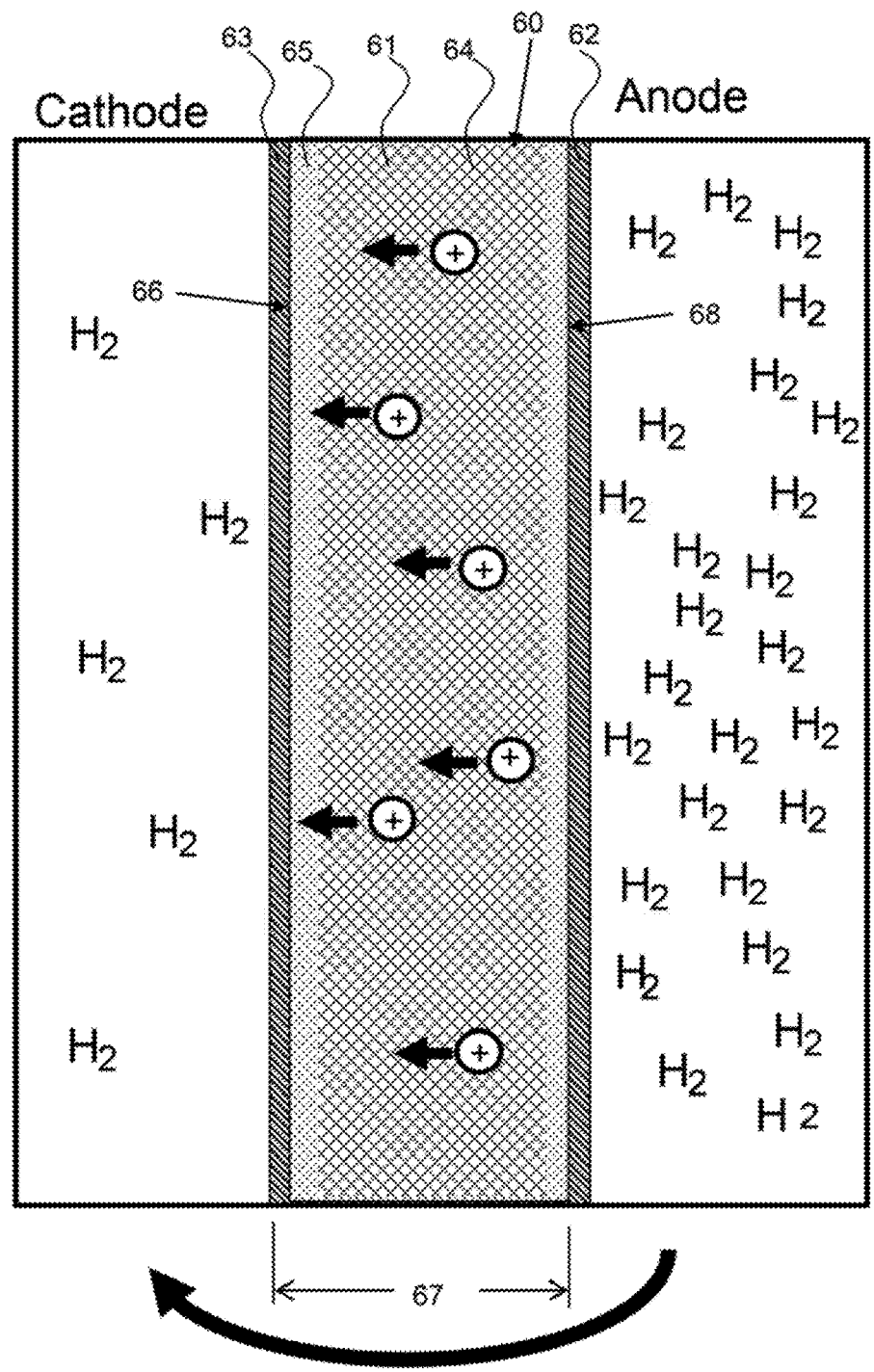
FIG. 4 shows a diagram of an exemplary Electro-Chemical-Expander.

As shown in FIG. 4, an exemplary electrochemical expander comprises a proton conducting layer 61 that transfers protons from the anode 62 to the cathode 63, where they reform into hydrogen. This produces electrical power that can be used to power an electrical device or be stored in an energy storage device, such as a battery, including a metal hydride battery, a rechargeable battery and the like. The hydrogen on the anode side is pressurized and is received from the multi-stage metal hydride compressor. The hydrogen on the cathode side is at a lower pressure and is recirculated back to the multi-stage metal hydride compressor for compression. The proton conducting layer 61 comprises a proton conducting polymer, such as an ionomer 65, and may comprise a support layer 64. The hydrogen is transferred from the anode side 68 to the cathode side 66 of the electrochemical expander.

Existing heat engines are capable of converting the thermal energy present in hot water into mechanical motion that turns a generator, similar to the operation of an existing steam engine. The major differences with the hydride heat engine of the present invention is that it operates at much lower temperatures than conventional heat engines (65° C. vs. >300° C.). The low operating temperature allows the hydride heat engine to use conventional, low cost, flat plate solar collectors as its heat source, which typically generate temperatures of approximately 85° C. An exemplary hydride heat engine of the present invention also differs in that it uses a motionless membrane electro-chemical compressor—that runs in reverse—as the "hydrogen expansion device" and thus has the potential of converting nearly 100% of the energy of the pressurize gas energy into electrical power. In addition, since Electro-Chemical-Expanders (ECE) are motionless catalytic devices, there is no theoretical dependency of their mass, size or cost to their efficiency, thus providing the possibility of extremely small size and weight and low cost of the ECE device, where historically the energy conversion device (such as the Freon mechanical compressor) contains the majority of the processes size, weight and cost.

Please note that other, even lower temperature heat sources, can be used to generate electricity efficiently and economically, such as; asphalt roofs, driveways, roads and parking lots, waste heat sources and geothermal and ocean thermal energy sources. While there are other heat engine and photovoltaic technologies that can convert solar energy into electricity, they have remained cost prohibitive for all but niche markets, with paybacks for most applications in excess of 30 years. Cost estimates for Hydride Heat Engine solar systems show a product that will generate electricity for a cost of less than 0.01 ¢/kWh, resulting in less than 0.6 year paybacks.

How it Works

The hydride heat engine is comprised of solar hot water panels, a fan cooler, a hydride-based hydrogen compressor and an Electro-Chemical-Expander (ECE). A simplified flow schematic for the system is presented in FIG. 1. The solar panels produce hot water using energy from the sun. The most economical use of solar energy is making hot water and flat plate solar collectors have been available for more than forty years. The hot water is pumped to the hydride compressor, which converts the thermal energy in hot water into work energy by compressing hydrogen gas via the cyclic heating and cooling of metal hydride heat exchangers. The compressed hydrogen gas is expanded in the ECE thus producing electricity, after which it returns to the hydride compressor.

Upon thermal contact with warm and cool water, the hydride heat engine generates electricity by, first, absorbing hydrogen gas directly into a metal material, thus forming an alloy of the metal and hydrogen called a "metal hydride". This process occurs at ambient temperature and generates some low temperature heat (at about 35° C.), which is rejected to the ambient air via the fan/radiator cooler. The metal hydride material is contained within patented very-high-surface-area heat exchangers which are alternately heated and cooled by recirculating water. The metal hydride referred to herein is a synonymous with a metal hydride forming compound.

After the hydrogen has been fully absorbed and the heat exchanger cooled, hot water from the flat plate solar collectors is circulated through the heat exchangers. The elevated temperature increases the hydrogen pressure inside of the heat exchangers at an exponential rate. Multiple stages of compression designed with appropriate alloys can produce very high pressures using low temperature heat. As shown in FIG. 2, a five stage hydride compressor can compress hydrogen gas from 21 psia to over 5000 psia using only the thermal energy of 75° C. hot water. The high pressure hydrogen is then passed through the ECE to produce electricity, before returning to the hydride compressor in its initial, uncompressed state.

This compression/expansion heat engine cycle can be repeated indefinitely. In this way, the hydrogen gas is simply a "working fluid" that is neither created nor consumed, but only pressurized and expanded. The ECE provides an efficient, economical and leak-free method of harnessing the work energy in the gas.

Electro-Chemical Expansion (ECE)

As depicted in FIG. 4, high pressure hydrogen gas is introduced to the anode of the ECE where hydrogen molecules are oxidized. This high pressure of hydrogen gas produces a high voltage on the electrode:

$$H_2 \rightarrow 2H^+ + 2e^-$$

The protons travel through a proton exchange membrane (PEM) and recombine with electrons at the cathode at a lower pressure. The lower hydrogen pressure produces a lower voltage on the electrode:

$$2H^+ + 2e^- \rightarrow H_2$$

The voltage produced by a single cell of the ECE is determined by the Nernst Equation:

$$E = -\frac{RT}{2F} \ln\left(\frac{P_{H_2,high}}{P_{H_2,low}}\right)$$

Figure 5:
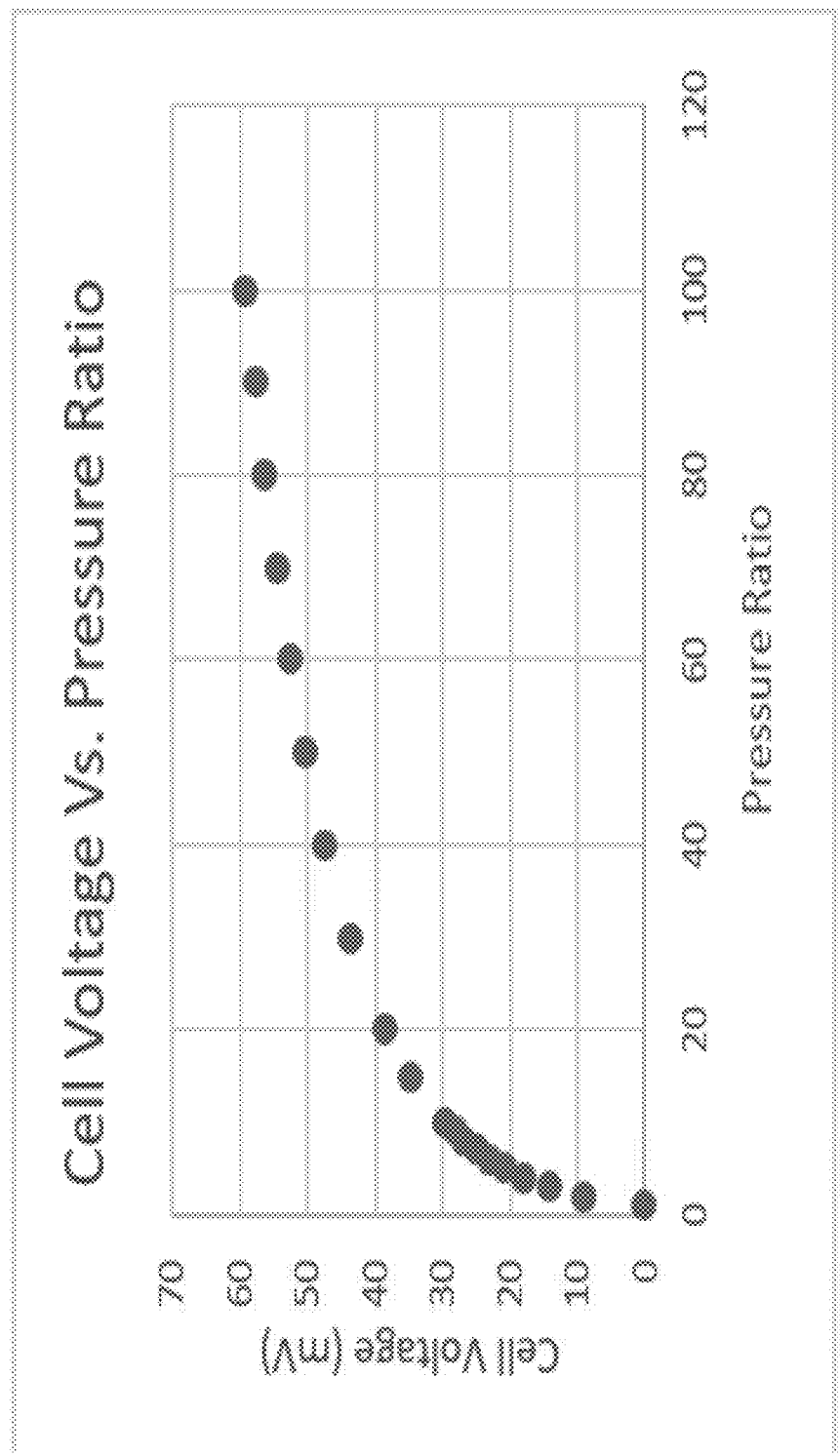
FIG. 5 shows a graph of cell voltage versus pressure ratio for an exemplary Electro-Chemical-Expander.

With reference to FIG. 5, the voltage and current produced represents the direct conversion of mechanical gas pressure energy into electrical energy, without any conversion of the chemical energy present (IE: Hydrogen gas).

Figure 6:
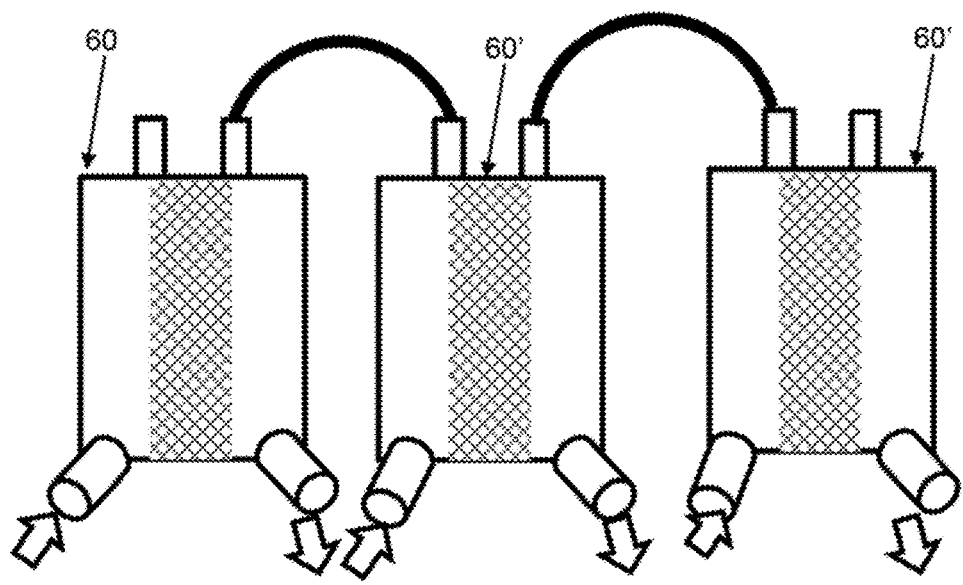
FIG. 6 shows a diagram of electrochemical expanders connected in series.

The actual voltage of a cell will also depend on the overpotential and the ohmic resistance of the configuration. Cells may be put in series to additively increase the voltage to the desired value. The voltage produced by this process in a single cell is small, but a plurality of ECE's can be configured in series to increase the output voltage, as shown in FIG. 6. A large number high-pressure hydrogen ECE's may be stacked with hundreds of cells to attain virtually any voltage. Any number of ECE's may be configured in series such as about 5 of more, about 10 or more, about 50 or more, about 100 or more and any range between and including the numbers provided.

Please note that the best theoretical conversion of mechanical gas pressure energy into electrical energy is 100%, Please also note that the ECE is a totally motionless catalytic device, that does not use, or require, the consumption of any chemicals or materials in order to perform its' catalytic function—The conversion of mechanical gas pressure into electrical energy. Therefore, the above realities provide the basis for the tremendous future possibilities, which are . . .

Almost 100% conversion of pressurized gas energy into electric power

A pressure-to electric conversion device that has almost zero mass

A pressure-to electric conversion device that has almost zero volume

A pressure-to electric conversion device that has almost zero cost

The ECE does not have any moving parts, therefore, long life and low maintenance.

Figure 7:
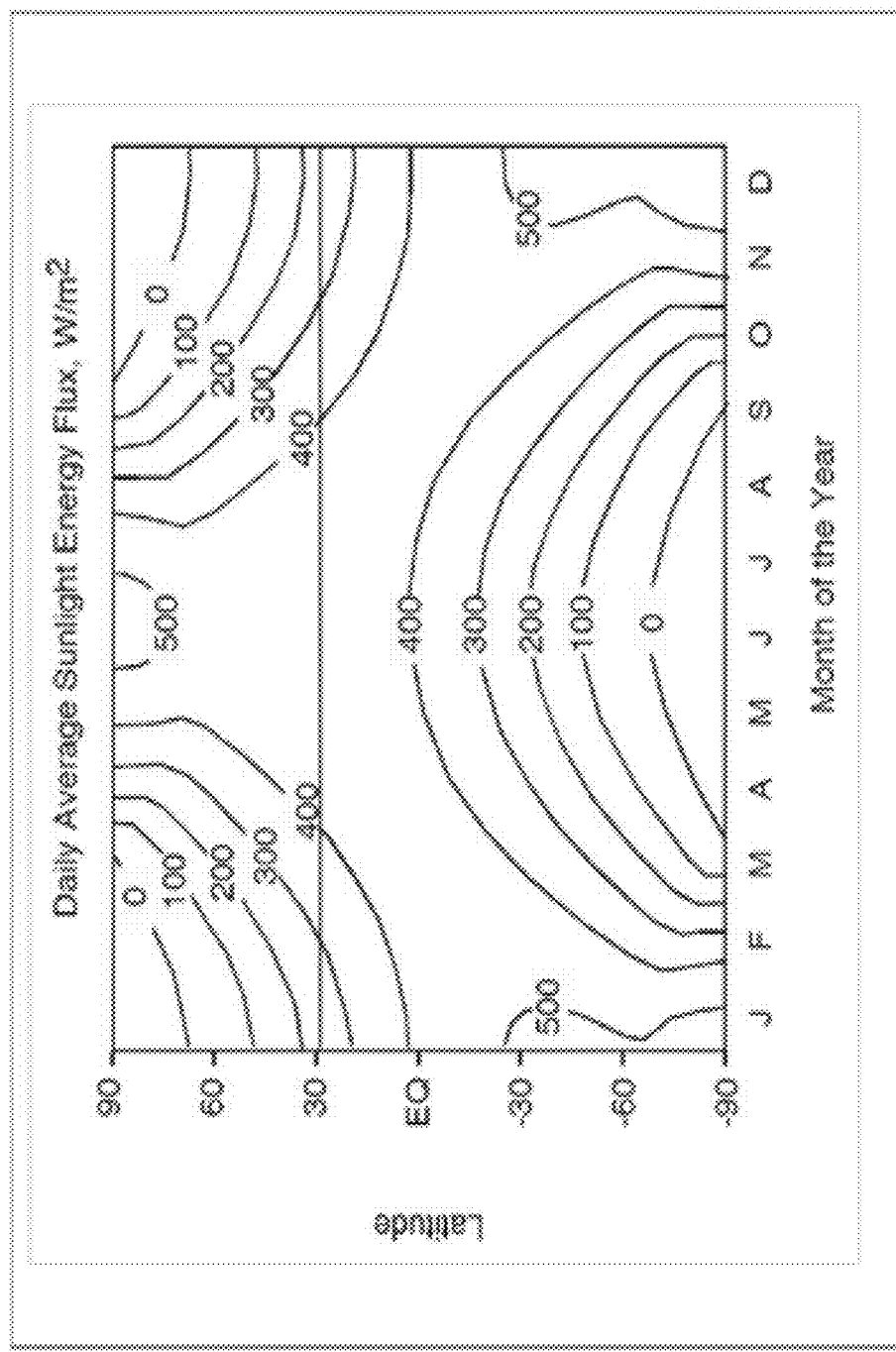
FIG. 7 shows a chart of the daily average sunlight energy as a function of latitude and month of the year.

Solar energy influx around the globe is well documented and modeled, as shown in FIG. 7. It is usually stated in terms of instantaneous power, watts per square meter (W/m2), and ranges from over 1400 W/m2 in the middle of the day at the equator to near zero in the winter at the poles, with variations dependent upon time of day, latitude, season and weather. For predicting solar heat engine performance and economics, it is useful to use a daily average of solar influx in a simplified model, such as the chart in FIG. 3. As an example of using the chart, Austin, Texas is located at about 30° north latitude and a dotted line has been drawn on the chart at that latitude.

Dividing the dotted line in FIG. 6 into 12 equal monthly segments, adding the daily solar influxes in each segment and dividing by twelve yields a daily average of 357 W/m2, upon which economic calculations can be made with reasonable accuracy. 357 W/m2 over the twenty four hour duration of a day yields 8,568 Wh of energy per day (357*24=8,568) and 3,127,320 Wh per square meter per year (8,568*365).

Efficiency

Capturing the solar influx cannot be done with 100% efficiency. In an exemplary hydride heat engine, the operating efficiencies of each component are multiplied to arrive at the overall efficiency. A good flat plate solar collector can convert sunlight into 85° C. hot water with 85% efficiency. Converting heat into compressed gas energy is done at a percentage of "Carnot" efficiency, which is based on the difference in temperature between the heat source (solar hot water) and the heat sink (cool water from the fan cooler). The Carnot efficiency formula is 1−(Tcold/Thot), where T is expressed as absolute temperature (temperature above absolute zero, which is minus 273° C.). Carnot efficiency is 14% when operating at 85 C. and cooling to 35 C. {1−[(35+273)/(85+273)]=1−[308/358]=1−0.860=0.14 or 14%}. The hydride heat engine is designed to operate at 75% of Carnot efficiency, which is 10% (0.75*14%).

Finally, the ECE efficiency is estimated to be at least 90%. Therefore, for each square meter of solar hot water collector, an exemplary hydride heat engine will yield an average electricity production of 21 watts, delivering 504 Wh of energy every day and 183,960 Wh per year.

Economics

The cost analysis for the solar heat engine is based on a distributed power generation scenario. Currently in the US, distributed power generators either reduce electricity consumption and its associated cost at a facility when they are producing power or, if they are producing more power than the facility needs, the excess power is sold to the utility grid at the same rate the grid charges to deliver electrical energy (¢/kWh), analogous to the electric meter "spinning backwards". Once in mass production the capital cost for an exemplary hydride heat engine, as described herein, will be less than $0.50 per watt of installed electric power generation, which results in an average cost of less than $0.50/W*21 W/m2/(184 kWh*20 years)=less than $0.01/kWh when amortized over a twenty year equipment life. If the cost of the displaced power generation is on the order of $0.10/kWh, then an exemplary hydride heat engine would have a payback period of less than ($0.50/W*21 W/m2)/(184 kWh/m2/year*$0.10/kWh)=0.6 years.

Proposed Work:

The concepts of the present invention will be used to design, build and test a 5 kilowatt (electric) solar-to-electric heat engine based on Hydride heat engine described herein, including the multi-stage metal hydride compressor and electro-chemical expansion technologies. The project will employ low cost solar thermal collectors as the prime energy source.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A hydride heat engine comprising:
   a) a hot water source;
   b) a multi-stage metal hydride compressor comprising:
      i) a plurality of metal hydride reservoirs comprising a metal hydride forming compound;
      ii) wherein the plurality of metal hydride reservoirs are coupled in series:
   c) an electrochemical-expander comprising:
      i) an anode;
      ii) a cathode;
      iii) an ionomer configured between and anode and cathode:
   d) a working fluid comprising hydrogen;
   e) a heating device that heats water to produce said hot water source, wherein the heating device heats the plurality of metal hydride reservoir to move the working fluid from a first metal hydride reservoir at a first pressure to a second metal hydride reservoir at a second pressure; wherein the second pressure is higher than the first pressure;
   wherein the working fluid is passed to the electro-chemical-expander and wherein the hydrogen is transported from the anode to the cathode of the electro-chemical-expander to produce electricity;
   wherein the metal hydride reservoirs are cooled by a flow of cold water.

2. The hydride heat engine of claim 1, wherein the heating device comprises a renewable heating device.

3. The hydride heat engine of claim 2, wherein the renewable heating device comprises a solar heating device and wherein the solar heating device is a solar hot water heater that produces the hot water source and wherein the hot water source heats the plurality of metal hydride reservoirs.

4. The hydride heat engine of claim 2, wherein the hot water source is in a closed loop and flows from the plurality of metal hydride reservoirs to the solar hot water heater.

5. A hydride heat engine comprising:
   a) a hot water source;
   b) a multi-stage metal hydride compressor comprising:
      i) a plurality of metal hydride reservoirs comprising a metal hydride forming compound;
      ii) wherein the plurality of metal hydride reservoirs are coupled in series;
   c) an electrochemical-expander comprising:
      iii) an anode;
      iv) a cathode;
      v) an ionomer configured between and anode and cathode;
   d) a working fluid comprising hydrogen;
   e) a heating device that heats water to produce said hot water source,
   wherein the heating device heats the plurality of metal hydride reservoir to move the working fluid from a first metal hydride reservoir at a first pressure to a second metal hydride reservoir at a second pressure; wherein the second pressure is higher than the first pressure;
   wherein the working fluid is passed to the electro-chemical-expander and wherein the hydrogen is transported from the anode to the cathode of the electro-chemical-expander to produce electricity;
   wherein the working fluid is in a closed loop and flows from the cathode of the electro-chemical-expander through the plurality of metal hydride reservoirs, to the anode of the electro-chemical-expander and finally through the ionomer to said cathode.

6. The hydride heat engine of claim 1, wherein the ionomer comprises a perfluorosulfonic acid ionomer.

7. The hydride heat engine of claim 6, wherein the ionomer is a supported ionomer having a support layer coupled thereto.

8. The hydride heat engine of claim 7, wherein the support material is configured in the ionomer.

9. The hydride heat engine of claim 1, wherein the ionomer has a thickness of no more than about 30 microns.

10. The hydride heat engine of claim 1, wherein the ionomer has a thickness of no more than about 20 microns.

11. The hydride heat engine of claim 1, wherein the ionomer has a thickness of no more than about 10 microns.

12. The hydride heat engine of claim 1, wherein the flow of cold water is from a body of water.

13. The hydride heat engine of claim 1, further comprising a battery and wherein the electricity produced by the electrochemical-expander is stored in said battery.

14. The hydride heat engine of claim 1, wherein the heating device comprises a solar heating device and wherein the solar heating device is a solar hot water heater that produces the hot water source and wherein the hot water source heats the plurality of metal hydride reservoirs.

15. The hydride heat engine of claim 1, wherein the flow of cold water is from a body of water selected from the group consisting of: ocean, sea, river and lake.

16. The hydride heat engine of claim 14, wherein the working fluid is in a closed loop and flows from the cathode of the electrochemical-expander through the plurality of metal hydride reservoirs, to the anode of the electrochemical-expander and finally through the ionomer to said cathode.

17. The hydride heat engine of claim 16, further comprising a series of valves to control the flow of the working fluid from a first metal hydride reservoir to a second metal hydride reservoir of the plurality of metal hydride reservoirs.

18. The hydride heat engine of claim 17, comprising at least two electrochemical-expander configured in series.

19. The hydride heat engine of claim 18, wherein the first metal hydride reservoir is coupled with the anode of a first electrochemical-expander and wherein the second metal hydride reservoir is coupled with the cathode of the first electrochemical-expander.

* * * * *